United States Patent [19]

Fischer et al.

[11] 3,838,465

[45] Sept. 24, 1974

[54] RECORDING AND/OR PLAYBACK APPARATUS WITH BATTERY INDICATION CONTROLLED BY COVER POSITION

[75] Inventors: Karl Fischer; Anton Muller, both of Vienna, Austria

[73] Assignee: U.S. Philips Corporation, New York, N.Y.

[22] Filed: May 16, 1973

[21] Appl. No.: 360,772

[30] Foreign Application Priority Data

May 25, 1972 Germany ............................ 7219613

[52] U.S. Cl. .................... 360/137, 136/182, 320/48, 324/29.5, 340/249

[51] Int. Cl... G11b 5/00, H01m 31/04, G01n 27/42

[58] Field of Search ............... 179/100.1 R, 100.1 S; 360/6, 31, 90, 91, 92, 93, 94, 95, 96, 137; 324/29.5; 320/48; 340/249; 136/182; 274/2

[56] References Cited

UNITED STATES PATENTS 3,562,441 2/1971 Bretschneider ..................... 360/137

OTHER PUBLICATIONS

Lafayette Catalog No. 720, Copyrighted 1971, page 111, Description of the Concord F104 Battery FM/AM Cassette Radio Player.

*Primary Examiner*—Raymond F. Cardillo, Jr.
*Attorney, Agent, or Firm*—Frank R. Trifari

[57] ABSTRACT

A recording and/or playback apparatus for battery operation having an indicator for battery voltage testing, which can be switched on and off by means of a switching element comprising a sensor which is actuated by means of a movable cover for a cassette compartment, the indicator being switched on, or being switched to stand by and subsequencly switched on by operating one of the controls of the apparatus, when the cover is in the opened position.

2 Claims, 2 Drawing Figures

RECORDING AND/OR PLAYBACK APPARATUS WITH BATTERY INDICATION CONTROLLED BY COVER POSITION

The invention relates to a recording and/or playback apparatus for battery operation, comprising a battery voltage indicator which is switched on by a movable switching element and a compartment which can hold a cassette containing a record carrier and can be closed by means of a cover, the cover being movable from a first position in which the compartment is uncovered to a second position in which the compartment is closed.

It is an object of the invention to provide for the user of such an apparatus a simple and effective control device for switching on the battery voltage indicator, without the use of additional controls on the apparatus.

The invention is characterized in that the switching element has a sensor which in the first position of the cover protrudes into the space occupied by the cover in its second position, the sensor being reset and the indicator being switched off when the cover is moved to the second position. In this way, the operation of moving the cover for the cassette compartment, which is routinely performed when inserting or removing a cassette while using an apparatus, is utilised to obtain an indication of the battery voltage. In principle, this operation is independent of the instantaneous mode of operation of the apparatus. However, it has been found beneficial that for switching on the indicator another control provided for switching on a different function of the apparatus should be operated in addition to the switching operation performed by the sensor. Said control may, for example, be a switch for switching on the power supply of the apparatus or for switching on a transport mode for the record carrier and the like. In this manner, the indication of the test result can be rendered dependent on the various modes of operation of the apparatus. It is obvious that a wide variety of optical or acoustic indicators may be employed.

The invention will now be described, by way of example, with reference to the drawing which shows two embodiments to which it should not be confined, however.

Figure 1:
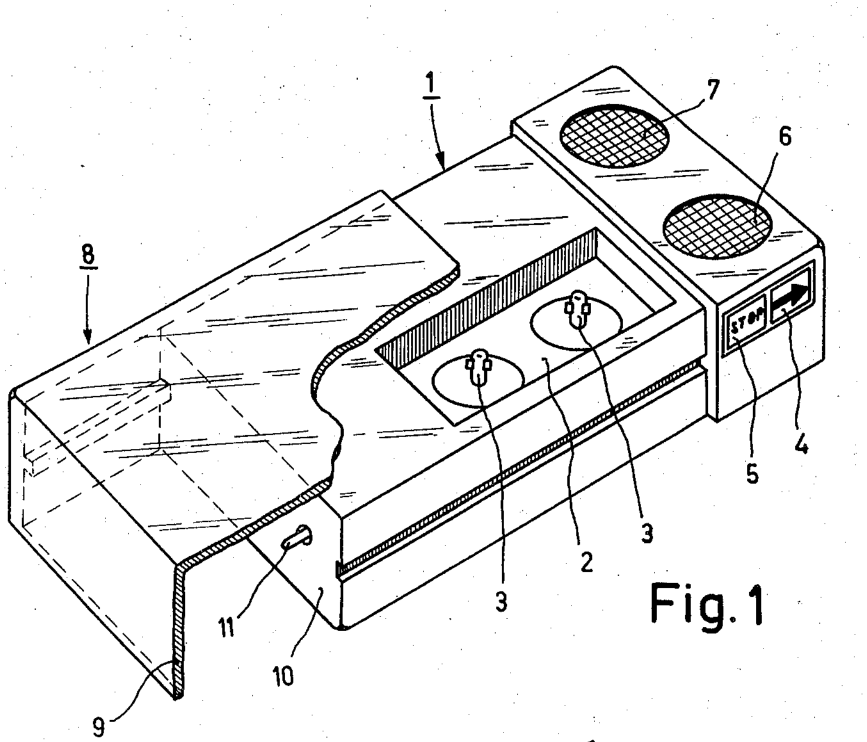
FIG. 1 shows an embodiment of an apparatus with a sliding cover for a casette compartment.

Reference numeral 1 in FIG. 1 indicates the chassis of a recording and/or playback apparatus for battery operation, which has a recess 2, which serves to hold a manually inserted cassette, not shown. Spindles 3 project into this recess 2 and when a cassette is inserted said spindles are coupled in the usual manner with the hubs in a cassette on which a record carrier is wound. The transport of the record carrier by a motor provided in the apparatus can be switched on with a button 4 and can subsequently be switched off with a button 5. A microphone 6 serves for recording and a loudspeaker 7 for reproducing signals. The recess 2 forming a cassette compartment can be closed with a cover 8 which can be slid along the chassis 1 by hand. FIG. 1 shows a part sectional view of the cover in the half closed position, i.e., a position intermediate between the first position in which the compartment 2 is ascessible and a second position in which the compartment 2 is closed. The cover is channel-shaped and has a side wall 9, which in the second position of the cover is positioned against a wall 10 of the chassis 1.

The apparatus is provided with an indicator for battery voltage testing, which in the present embodiment operates acoustically, as for example described in Austrian Patent Specifications no. 267,904. The indicator is constituted by the loud speaker 7 to which an alternating voltage from the motor circuit can be applied whose amplitude and/or frequency are a measure of the charging condition of the batteries of the apparatus, thus enabling the user to ascertain acoustically whether the batteries are still in order or whether they are to be replaced.

The switching element normally provided for switching on and off such an indicator now has a sensor 11 which projects from the wall 10 of the chassis 1 and which in the first position of the cover 8 protrudes into the space occupied by the cover in its second position, the sensor 11 being depressed when moving the cover to the second position, thus switching off the indicator. When the cover 8 is in the position shown in FIG. 1 or when it gives full access to the compartment 2, the sensor 11 protrudes from the chassis, so that via the switching element, not shown, the battery voltage indicator is set to standby. In the present embodiment, the actual indication is not obtained until the control 4 for switching on the transport of the record carrier is also actuated, because in that case the motor being energized and an alternating voltage being supplied.

As will be seen, battery voltage testing is possible by suitably positioning the cover and operating the button 4, irrespective of whether a cassette has been inserted in the compartment 2, or not.

Figure 2:
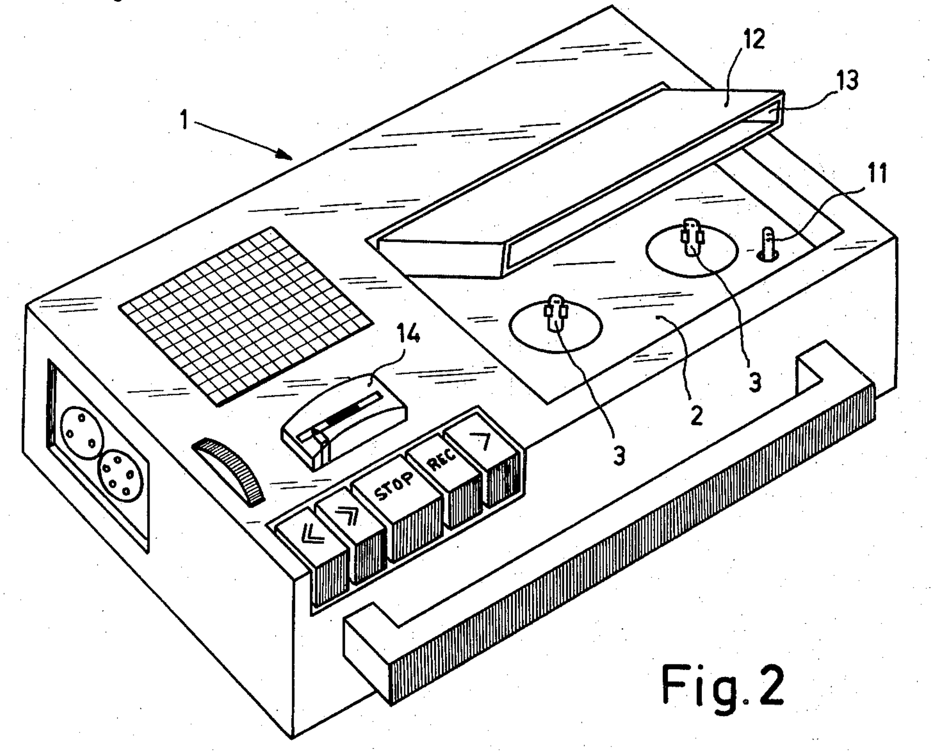
FIG. 2 shows an embodiment of an apparatus in which a cassette can be brought into a cassette compartment by means of a hinged cassette holder on the apparatus, the cassette holder simultaneously serving as the cover for this compartment.

In the embodiment according to FIG. 2, the cover for compartment 2 is constituted by a hinged box-shaped cassette holder 12, in the opening 13 of which a cassette can be inserted in the first position in which the holder is hinged away from the compartment 2, so that the cassette can be brought into the compartment 2 by hinging the cassette holder into its second position, the cassette holder thus closing the compartment 2.

In this case, a meter 14 has been provided as an indicator for battery voltage testing, which by means of a switching element can be connected to the battery voltage in a manner not shown. The switching element has a sensor 11 which projects into the compartment 2 through an opening in the bottom of said compartment when the cassette holder is in the first position as shown in FIG. 2. The indicator is then switched on and the instantaneous battery voltage can be read on meter 14. When the cassette holder is swung into its second position, it will push the sensor 11 out of the compartment 2, thus switching off the indicator; the meter 14 may then be used for other purposes, for example, for indicating the modulation of the record carrier during a recording.

In this embodiment, an automatic indication of the instantaneous voltage is thus obtained by raising the cover for the cassette compartment.

What is claimed is:

1. A recording and/or playback apparatus for battery operation, comprising a battery voltage indicator which is switched on by a movable switching element and a compartment which can hold a cassette containing a record carrier, and can be closed by means of a cover, the cover being movable from a first position in which the compartment is uncovered to a second position in which the compartment is closed, characterized in that the switching element has a sensor which in the first position of the cover protrudes into the space occupied by the cover in its second position, the sensor being reset and the indicator being switched off when the cover is moved to the second position.

2. An apparatus as claimed in claim 1, characterized in that, in order to switch on the indicator, a control provided for switching on a different function of the apparatus is to be operated in addition to the switching operation performed by the sensor.

* * * * *

PO-1050
(5/69)

UNITED STATES PATENT OFFICE
CERTIFICATE OF CORRECTION

Patent No. 3,838,465 Dated September 24, 1974

Inventor(s) KARL FISCHER & ANTON MULLER

It is certified that error appears in the above-identified patent and that said Letters Patent are hereby corrected as shown below:

In the heading:

under "Foreign Application Priority Data"

"7219613" should be --G.7219613.5--

Signed and sealed this 17th day of December 1974.

(SEAL)
Attest:

McCOY M. GIBSON JR.
Attesting Officer

C. MARSHALL DANN
Commissioner of Patents

Signed and sealed this day of 1974.